United States Patent
Hassan et al.

(10) Patent No.: US 9,106,433 B2
(45) Date of Patent: *Aug. 11, 2015

(54) PREDICTING DEGRADATION OF A COMMUNICATION CHANNEL BELOW A THRESHOLD BASED ON DATA TRANSMISSION ERRORS

(71) Applicant: Microsoft Corporation, Redmond, WA (US)

(72) Inventors: Amer A. Hassan, Kirkland, WA (US); Deyun Wu, Issaquah, WA (US); Christian Huitema, Clyde Hill, WA (US); Vishesh M. Parikh, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,380

(22) Filed: Jan. 28, 2013

(65) Prior Publication Data

US 2013/0139011 A1    May 30, 2013

Related U.S. Application Data

(63) Continuation of application No. 11/290,144, filed on Nov. 30, 2005, now Pat. No. 8,381,047.

(51) Int. Cl.
*G06F 11/00* (2006.01)
*G01R 31/28* (2006.01)
(Continued)

(52) U.S. Cl.
CPC ............ *H04L 12/2697* (2013.01); *H04L 1/002* (2013.01); *H04L 1/20* (2013.01); *H04L 1/0009* (2013.01)

(58) Field of Classification Search
None
See application file for complete search history.

(56) References Cited

U.S. PATENT DOCUMENTS

| 5,388,211 A | 2/1995 | Hornbuckle |
| 5,436,906 A | 7/1995 | Kasuya |

(Continued)

FOREIGN PATENT DOCUMENTS

| DE | 19538124 A1 | 4/1997 |
| EP | 1267586 | 12/2002 |

(Continued)

OTHER PUBLICATIONS

EP Communication for Application No. 06 837 250.7-1851, Reference FB20059, Apr. 10, 2013.

(Continued)

*Primary Examiner* — Daniel McMahon
(74) *Attorney, Agent, or Firm* — Sunah Lee; Kate Drakos; Micky Minhas

(57) ABSTRACT

Applicants have discovered that error detection techniques, such as Forward Error Correction techniques, may be used to predict the degradation below a certain threshold of an ability to accurately convey information on a communication channel, for example, to predict a failure of the communication channel. In response, transmission and/or reception of information on the channel may be adapted, for example, to prevent the degradation below the threshold, e.g., prevent channel failure. Predicting the degradation may be based, at least in part, on data transmission error information corresponding to one or more blocks of information received on the channel and may include determining an error rate pattern over time. Based on these determinations, the degradation below the threshold may be predicted and the transmission and/or reception adapted. Adapting may include initiating use of a different error encoding scheme and/or using an additional communication channel to convey information.

20 Claims, 5 Drawing Sheets

(51) Int. Cl.
  *H03M 13/00* (2006.01)
  *H04L 12/26* (2006.01)
  *H04L 1/20* (2006.01)
  *H04L 1/00* (2006.01)

(56) References Cited

U.S. PATENT DOCUMENTS

| | | |
|---|---|---|
| 5,553,083 A | 9/1996 | Miller |
| 5,600,663 A | 2/1997 | Ayanoglu |
| 5,839,061 A | 11/1998 | Hendrickson et al. |
| 5,867,538 A | 2/1999 | Liu |
| 5,870,666 A | 2/1999 | Tanaka et al. |
| 5,907,563 A | 5/1999 | Takeuchi |
| 6,035,183 A | 3/2000 | Todd et al. |
| 6,052,600 A | 4/2000 | Fette |
| 6,067,575 A | 5/2000 | McManis |
| 6,073,214 A | 6/2000 | Fawcett |
| 6,105,068 A | 8/2000 | Naudus |
| 6,182,264 B1 | 1/2001 | Ott |
| 6,282,709 B1 | 8/2001 | Reha |
| 6,327,312 B1 | 12/2001 | Jovanovich et al. |
| 6,360,077 B2 | 3/2002 | Mizoguchi |
| 6,378,126 B2 | 4/2002 | Tang |
| 6,381,742 B2 | 4/2002 | Forbes |
| 6,430,738 B1 | 8/2002 | Gross |
| 6,591,382 B1 | 7/2003 | Molloy |
| 6,769,046 B2 | 7/2004 | Adams et al. |
| 6,788,959 B2 | 9/2004 | Jokinen |
| 6,823,181 B1 | 11/2004 | Kohno et al. |
| 6,891,858 B1 | 5/2005 | Mahesh |
| 6,931,578 B1* | 8/2005 | Gill ............... 714/704 |
| 6,937,877 B2 | 8/2005 | Davenport |
| 6,967,930 B2 | 11/2005 | Burmeister |
| 7,069,045 B2 | 6/2006 | Wu |
| 7,111,249 B2 | 9/2006 | Kenyon |
| 7,149,948 B2 | 12/2006 | Davis |
| 7,151,925 B2 | 12/2006 | Ting |
| 7,164,912 B2 | 1/2007 | Buckley et al. |
| 7,181,218 B2 | 2/2007 | Ovesjo |
| 7,218,645 B2 | 5/2007 | Lotter et al. |
| 7,260,369 B2 | 8/2007 | Feher |
| 7,283,838 B2 | 10/2007 | Lu |
| 7,319,870 B2 | 1/2008 | Olson |
| 7,376,721 B2 | 5/2008 | Braun |
| 7,404,074 B2 | 7/2008 | Murotake |
| 7,433,707 B2 | 10/2008 | Kaminski |
| 7,496,739 B1 | 2/2009 | Raghavan |
| 7,681,239 B2 | 3/2010 | Hassan |
| 7,784,028 B2 | 8/2010 | Luo |
| 7,784,029 B2 | 8/2010 | Hassan |
| 8,346,900 B2 | 1/2013 | Hassan |
| 8,381,047 B2 | 2/2013 | Hassan |
| 8,396,041 B2 | 3/2013 | Hassan |
| 2002/0083360 A1 | 6/2002 | Popplewell et al. |
| 2002/0083432 A1 | 6/2002 | Souissi |
| 2002/0091702 A1 | 7/2002 | Mullins |
| 2002/0138796 A1* | 9/2002 | Jacob ............... 714/712 |
| 2002/0144134 A1 | 10/2002 | Watanabe |
| 2002/0165986 A1 | 11/2002 | Tarnoff |
| 2002/0173271 A1 | 11/2002 | Blair |
| 2002/0178417 A1* | 11/2002 | Jacob et al. ............... 714/752 |
| 2003/0003937 A1 | 1/2003 | Ohkubo et al. |
| 2003/0039214 A1 | 2/2003 | Huffman |
| 2003/0050055 A1 | 3/2003 | Ting et al. |
| 2003/0097623 A1 | 5/2003 | Razavilar et al. |
| 2003/0100308 A1 | 5/2003 | Rusch |
| 2003/0120583 A1 | 6/2003 | Olson |
| 2003/0133435 A1 | 7/2003 | Friedrich |
| 2003/0214417 A1 | 11/2003 | Peltz |
| 2003/0216927 A1 | 11/2003 | Sridhar |
| 2003/0219034 A1 | 11/2003 | Lotter |
| 2004/0029575 A1 | 2/2004 | Mehta |
| 2004/0034853 A1 | 2/2004 | Gibbons |
| 2004/0048608 A1 | 3/2004 | Matsuo |
| 2004/0052252 A1 | 3/2004 | Karaoguz et al. |
| 2004/0063425 A1 | 4/2004 | Wakutsu |
| 2004/0073801 A1 | 4/2004 | Kalogridis |
| 2004/0073901 A1 | 4/2004 | Imamatsu |
| 2004/0098715 A1 | 5/2004 | Aghera |
| 2004/0117623 A1 | 6/2004 | Kalogridis |
| 2004/0242261 A1 | 12/2004 | Fette |
| 2004/0246001 A1 | 12/2004 | Sontag et al. |
| 2005/0007988 A1 | 1/2005 | Ferris |
| 2005/0027789 A1 | 2/2005 | Luo |
| 2005/0055689 A1 | 3/2005 | Abfalter |
| 2005/0059427 A1 | 3/2005 | Wallace |
| 2005/0079842 A1 | 4/2005 | Shi |
| 2005/0081220 A1 | 4/2005 | Yodaiken |
| 2005/0108382 A1 | 5/2005 | Murotake |
| 2005/0174981 A1 | 8/2005 | Heath et al. |
| 2005/0190827 A1 | 9/2005 | Xu |
| 2005/0227692 A1 | 10/2005 | Kawashima et al. |
| 2005/0251725 A1 | 11/2005 | Huang |
| 2006/0084475 A1 | 4/2006 | Ohkubo et al. |
| 2006/0265706 A1 | 11/2006 | Isaacson |
| 2007/0077903 A1 | 4/2007 | Hassan |
| 2007/0077952 A1 | 4/2007 | Sartori |
| 2007/0078924 A1 | 4/2007 | Hassan |
| 2007/0104218 A1 | 5/2007 | Hassan et al. |
| 2009/0270113 A1 | 10/2009 | Feher |
| 2012/0026974 A1 | 2/2012 | Fong |

FOREIGN PATENT DOCUMENTS

| | | |
|---|---|---|
| EP | 1 289 181 | 3/2003 |
| GB | 2 350 749 A | 12/2000 |
| GB | 2399999 A | 9/2004 |
| JP | H06/244791 | 9/1994 |
| JP | 2001/230809 | 8/2001 |
| JP | 2003-087858 A | 3/2003 |
| JP | 2003/298559 | 10/2003 |
| JP | 2004/253828 | 9/2004 |
| JP | 2005-122699 A | 5/2005 |
| JP | 2006-109397 A | 4/2006 |
| JP | 2006-309533 A | 11/2006 |
| WO | 02/37222 A2 | 5/2002 |
| WO | 02/078219 A1 | 10/2002 |
| WO | 03/028228 A2 | 4/2003 |
| WO | WO 03/071813 | 8/2003 |
| WO | 2004/008719 A2 | 1/2004 |
| WO | WO 2004/042982 | 5/2004 |
| WO | WO 2005/036809 | 4/2005 |
| WO | 2007/056467 A1 | 5/2007 |
| WO | 2007/064455 A1 | 6/2007 |

OTHER PUBLICATIONS

KR Notice of Preliminary Rejection for Application No. 10-2008-7011099, Nov. 20, 2012.
KR Notice of Preliminary Rejection for Application No. 2008-7013184, Sep. 28, 2012.
CN Notice on the Fourth Office Action for Application No. 200680041463.6, Jun. 5, 2012.
CN Notice on the Second Office Action for Application No. 200680044639.3, Jul. 2, 2012.
EP Supplementary Search Report, Ref. FB20059, for Application No. 068372507-1237/1955468 PCT/US2006043655, Jun. 1, 2012.
International Search Report, for Application No. PCT/US2006/043511, Mar. 28, 2007.
International Search Report, for Application No. PCT/US06/24419, Mar. 21, 2007.
International Search Report, for Application No. PCT/US2006/043655, Mar. 23, 2007.
CN First Office Action, Application No. 200680044639.3, Feb. 22, 2011.
JP Notice of Rejection, Application No. 2008-543302, Nov. 30, 2011.
CN First Office Action, Application No. 200680041463.6, Mar. 13, 2009.
G.D. Forney, "The Viterbi Algorithm" Proceedings of the IEEE, vol. 61, No. 3, pp. 268-278, Mar. 1973.
International Search Report, Application No. PCT/US2006/043655, Nov. 8, 2006.

(56) References Cited

OTHER PUBLICATIONS

European search report from European patent application No. 06837169.9 dated Feb. 28, 2011.
International Search report from International Application No. PCT/US2006/043511, dated Nov. 8, 2006.
Wireless Personal Communications; Abstract, http://www.springerlink.com/app/home/contribution.asp?wasp=6cd98a3e17b74e0e965db7c159389506&referrer=parent&backto=issue,9,12; journal,62,87; linkingpublicationresults,1:100345,1, retrieved Feb. 13, 2006.
Wiley InterScience; Research Article Software Radio-a key technology for adaptive access; Abstract; http://www3.interscience.wiley.com/cgi-bin/abstracts/101526373/ABSTRACT, retrieved Feb. 13, 2006.
Forward error correcting for CDMA systems; Abstract; http://ieeexplore.ieee.org/xpl/abs_free.jsp?arNumber=563190, retrieved Feb. 13, 2006.
JP Notice of Rejection for Application No. 2008-543302, Jan. 22, 2013.
EP Communication for Application No. 06837169.9-1852, Ref. FB20052, Feb. 7, 2014.
Falk, "Approaches for Secure SDR Software Download", In Proceedings of the Software Defined Radio Forum Technical Conference (SDR 2004), Nov. 15-18, 2004.
Carpenter, "Software Defined Radio Test Bed for Integrated Communications and Navigation Applications", in Proceedings of the Software Defined Radio Forum Technical Conference (SDR 2004), Nov. 15-18, 2004.
Polson, "Cognitive Radio Applications in Software Defined Radio", Iin Proceedings of the Software Defined Radio Forum Technical Conference (SDR 2004), Nov. 15-18, 2004.
Nakajima, "Research and Developments of Software-Defined Radio Technologies in Japan", IEEE Communications Magazine, Aug. 2001.
Foka, "Software Defined Radio", May 2002.
PCT International Search Report and Written Opinion for Application No. PCT/US2006/038338, Reference 314496.07WO, Feb. 21, 2007.
CN First Office Action for Application No. 200680036379.5, Jun. 26, 2009.
EP Communication for Application No. 06815961.5-1244/1934787, Reference FB19883, Feb. 13, 2012.
JP Notice of Rejection for Application No. 2008-533733, Feb. 8, 2012.
KR Notice of Preliminary Rejection for Application No. 10-2008-7007659, Reference 314496.11, May 29, 2013.
Ashcraft, "Using Programmer-Written Compiler Extensions to Catch Security Holes", Proceedings of the 2002 IEEE Symposium on Security and Privacy (S&P'02), May 12-15, 2002.
Balfanz, "Usable Access Control for the World Wide Web", Proceedings of the 19th Annual Computer Security Applications Conference (ACSAC 2003), Dec. 8-12, 2003.
Hoflehner, "The compiler as a validation and evaluation tool", Compiler Optimization Meets Compiler Verification (COCV'03), Published by Elsevier Science B. V., Apr. 12, 2003.
Mitola III, "SDR Architecture Refinement for JTRS", Proceedings of the 21st Century Military Communications Conference (MILCOM 2000), Oct. 22-25, 2000.
Mitola III, "Cognitive Radio: An Integrated Agent Architecture for Software Defined Radio", May 8, 2000.
Mohebbi, "A Case Study of Mapping a Software-Defined Radio (SDR) Application on a Reconfigurable DSP Core", Proceedings of the 1st IEEE/ACM/IFIP International Conference on Hardware/Software Codesign and System Synthesis (CODES+ISSS'03), Oct. 1-3, 2003.
SDR forum, "Report on Issues and Activity in the Area of Security for Software Defined Radio", Sep. 1, 2002.
International Telecommunication Union, "Information and Proposed Actions Relative to ITU-R Document on Software Defined Radio", Software Defined Radio Forum, Radiocommunication Study Groups, Mar. 16, 2003.
General Dynamics, C4 Systems, "Digital Modular Radio (DMR): Overview", Printed on Sep. 29, 2005.
WiNRADiO®, "PC Radios Rule", Printed on Sep. 29, 2005.
Glossner, "Wireless SDR Solutions: The Challenge and Promise of Next Generation Handsets", Published at the Communications Design Conference, Nov. 2002.
PCT International Search Report and Written Opinion for Application No. PCT/US2006/038517, Reference 313971.12WO, Feb. 15, 2007.
PCT International Preliminary Report on Patentability for Application No. PCT/US2006/038517, Reference 313971.12WO, Apr. 10, 2008.
CN Notice on the Second Office Action for Application No. 200680041463.6, Oct. 19, 2010.
CN Notice on the Third Office Action for Application No. 200680041463.6, Jan. 18, 2012.
CN Notice on the Third Office Action for Application No. 200680044639.3, Sep. 21, 2012.
EP Communication for Application No. 06837250.7-1851, Reference FB20059, Jan. 6, 2015.
KR Notice of Preliminary Rejection for Application No. 10-2008-7007659, May 29, 2013.

\* cited by examiner

PREDICTING DEGRADATION OF A COMMUNICATION CHANNEL BELOW A THRESHOLD BASED ON DATA TRANSMISSION ERRORS

RELATED APPLICATIONS

This application is a continuation of and claims benefit from U.S. patent application Ser. No. 11/290,144 that was filed on Nov. 30, 2005 and that is incorporated herein by reference in its entirety.

BACKGROUND

Known network communication technologies typically use the Cyclic Redundancy Check (CRC) to detect data transmission errors on a communication channel. If a certain threshold number of information errors are detected for the channel using CRC, the channel is deemed to have failed. Any service provided on the channel is interrupted, and another channel or other means of communication must be used to re-establish communication.

Further, the threshold number of data errors may be set so high that much data is lost before channel failure. Also, before failure, logical components in the network communications stack (e.g., TCP/IP stack) attempt to compensate for the CRC-detected data errors, causing further delay and consuming processing resources.

SUMMARY

This Summary provides an illustrative context for aspects of the invention, in a simplified form. It is not intended to be used to determine the scope of the claimed subject matter, nor to identify key and/or essential features of the claimed subject matter. Aspects of the invention are described more fully below in the Detailed Description.

Applicants have discovered that error detection techniques (e.g., Forward Error Correction (FEC) techniques) may be used to predict the degradation below a certain threshold of an ability to accurately convey information on a communication channel (e.g., predict a failure of the communication channel). In response, transmission and/or reception of information on the channel may be adapted, e.g., to prevent the degradation below the threshold (e.g., prevent channel failure). In some embodiments, the communication channel is a channel of a software-defined radio.

Predicting the degradation may be based, at least in part, on data transmission error information corresponding to one or more blocks of information received on the communication channel (e.g., the error rate(s) of the block(s)) and may include determining an error rate pattern over time. Based on these determinations, the degradation below the threshold may be predicted and the transmission and/or reception adapted. Adapting may include initiating use of a different error encoding scheme and/or using an additional communication channel to convey information.

The data transmission error information may include any variety of information, including: a number of errors detected (e.g., determined using hard decision decoding (HDD)); a soft error distance (determined using soft decision decoding (SDD)); a probability ratio; other information; and any suitable combination of the foregoing.

Predicting degradation below a particular threshold on a communication channel and acting on this prediction may prevent failure of the channel and the resulting interruptions in communications on the channel. This technique contrasts to known systems in which a channel failure is not predicted, but rather occurs after a certain number of CRC errors are detected.

In circumstances in which the degradation is caused by an increased distance between a sending network device and a receiving network device, predicting degradation and avoiding channel failure may extend a range of communication between the two devices, one or both of which may be mobile. Thus, communication may be maintained as a mobile user device moves further away from the other network device, which also may be a mobile user device. Further, adapting communication in response to the prediction may overcome interference that would otherwise prevent communication between two network devices.

In an embodiment of the invention, information received on a network device on a communication channel is handled. A degradation below a particular threshold of an ability to accurately convey information on the communication channel is predicted, based at least in part on data transmission error information corresponding to at least a first block of the information received on the communication channel.

In an aspect of this embodiment, the transmission and/or reception of information on the communication channel is adapted in response to predicting the degradation below a particular threshold.

In another aspect of this embodiment, the adapting includes adapting the transmission and/or reception to prevent the degradation below the threshold.

In another aspect of this embodiment, the information is received encoded according to a first encoding algorithm, and the adapting includes initiating a changing of the encoding of the information from the first encoding algorithm to a second encoding algorithm.

In yet another aspect of this embodiment, the adapting includes establishing an additional communication channel on which to receive and/or transmit information.

In another aspect of this embodiment, the data transmission error information corresponding to the at least first block is determined.

In another aspect of this embodiment, a number of information transmission errors within the at least first block is determined using a hard decision decoding technique.

In another aspect of this embodiment, the adapting includes determining a soft error distance of the at least first block using a soft decision decoding technique.

In yet another aspect of this embodiment, the adapting includes determining a probability metric of transmission errors corresponding to the at least first block.

In another aspect of this embodiment, the adapting includes using Forward Error Correction to determine the data transmission error information.

In another aspect of this embodiment, the adapting includes determining the data transmission error information based on errors corrected using Forward Error Correction.

In another aspect of this embodiment, the adapting includes determining over a period of time, for each of a plurality of blocks of information of a same size received during the period of time, data transmission error information corresponding to the block, the data transmission error information representing an error rate of the block. In this aspect, an error rate pattern over the period of time is determined based on the error rates of the blocks, and the predicting includes predicting the degradation below the particular threshold based at least in part on the determined pattern.

In yet another aspect of this embodiment, the determining includes determining an increase in the error rates over the period of time, and the predicting includes comparing the determined increase with a threshold value and predicting the degradation below the particular threshold value based at least in part on the comparison.

In another aspect of this embodiment, the predicting includes determining a first metric of data transmission errors corresponding to a most recently received block of the plurality of blocks, comparing the metric to a threshold value and predicting the degradation below the particular threshold based at least in part on a result of the comparison.

In another aspect of this embodiment, the predicting includes determining a first metric of data transmission errors corresponding to the at least first block, comparing the metric to a threshold value and predicting the degradation below the particular threshold based at least in part on a result of the comparison.

In yet another aspect of this embodiment, the communication channel corresponds to an application, and the predicting includes comparing the metric to a threshold value corresponding to the application.

In another aspect of this embodiment, the predicting is implemented by an operating system of the network device.

In another aspect of this embodiment, the information is received on the communication channel of a software-defined radio, and the predicting includes predicting the degradation on the communication channel of the software-defined radio.

One or more acts of the preceding embodiment and/or one or more aspects thereof may be implemented using a computer or other type of computational system.

Aspects of this embodiment of the invention include any suitable combination of the foregoing aspects and/or variations thereof.

In another embodiment of the invention, a computer program is provided that includes instructions that, as a result of being executed by a computer, instruct the computer to perform the method of the embodiment of the invention described in the preceding paragraphs and/or one or more aspects thereof described in the preceding paragraphs.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system for handling information received on a network device on a communication channel is provided. The system includes a prediction module to predict a degradation below a particular threshold of an ability to accurately convey information on the communication channel based at least in part on data transmission error information corresponding to at least a first block of the information received on the communication channel.

In an aspect of this embodiment, the system includes a transmission adapter module to control an adapting of transmission and/or reception of information on the communication channel in response to predicting the degradation below a particular threshold.

In another aspect of this embodiment, the transmission adapter module is operative to adapt the transmission and/or reception to prevent the degradation below the threshold.

In another aspect of this embodiment, the information is received encoded according to a first encoding algorithm, and the transmission adapter module is operative to initiate a changing of the encoding of the information from the first encoding algorithm to a second encoding algorithm in response to predicting the degradation.

In yet another aspect of this embodiment, the transmission adapter module is operative to establish an additional communication channel on which to receive and/or transmit the information in response to predicting the degradation.

In another aspect of this embodiment, the prediction module is operative to determine or receive within the at least first block the data transmission error information corresponding to the at least first block.

In another aspect of this embodiment, the prediction module is operative to determine a number of information transmission errors with the at least first block using a hard decision decoding technique.

In another aspect of this embodiment, the prediction module is operative to determine a soft error distance of the at least first block using a soft decision decoding technique.

In yet another aspect of this embodiment, the prediction module is operative to determine a probability metric of transmission errors corresponding to the at least first block.

In another aspect of this embodiment, the system includes a Forward Error Correction decoder, and the prediction module is operative to receive information from the Forward Error Correction decoder indicative of the data transmission error information.

In another aspect of this embodiment, the prediction module is operative to determine the data transmission error information based on errors corrected by the Forward Error Correction decoder.

In another aspect of this embodiment, the prediction module is operative to: determine over a period of time, for each of a plurality of blocks of information of a same size received during the temporal interval, data transmission error information corresponding to the block, the data transmission error information representing an error rate of the block; determine an error rate pattern over the period of time based on the error rates of the blocks; and predict the degradation below the particular threshold based at least in part on the determined pattern.

In another aspect of this embodiment, the prediction module is operative to determine an increase in the error rates over the period of time, compare the determined increase with a threshold value and predict the degradation below the particular threshold value based at least in part on the comparison.

In another aspect of this embodiment, the prediction module is operative to determine a metric of data transmission errors corresponding to a most recently received block of the plurality of blocks, to compare the metric to a threshold value and to predict the degradation below the particular threshold based at least in part on the comparison.

In yet another aspect of this embodiment, the prediction module is operative to determine a metric of data transmission errors corresponding to the at least first block, compare the metric to a threshold value and to predict the degradation below the particular threshold based at least in part on the comparison.

In another aspect of this embodiment, the communication channel corresponds to an application, and the prediction module is operative to compare the metric to a threshold value corresponding to the application.

In another aspect of this embodiment, the prediction module is implemented by an operating system of the network device.

In another aspect of this embodiment, the information is received on the communication channel of a software-defined radio, and the prediction module is operative to predict a degradation of information transmission on the communication channel of the software-defined radio.

Other advantages, novel features, and objects of the invention, and aspects and embodiments thereof will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Although several embodiments of the invention are described herein as being implemented using an FEC decoder and/or FEC decoding techniques, it should be appreciated that the invention is not so limited. Any of a variety of other techniques for detecting data transmission errors may be used and are intended to fall within the scope of the invention.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

Examples

Figure 1:
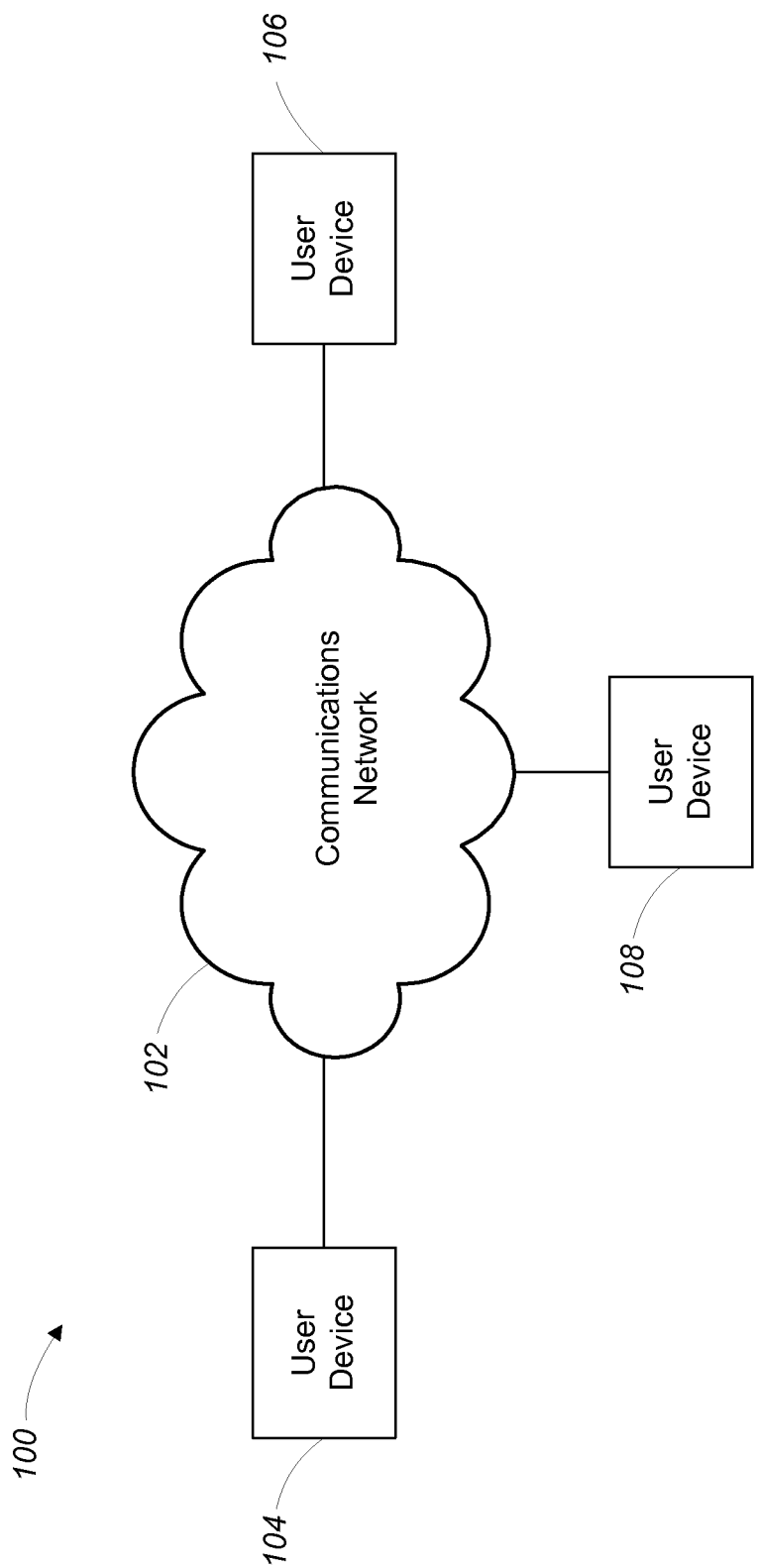
FIG. 1 is a block diagram illustrating an example of a network system on which one or more embodiments of the system may be implemented.

FIG. 1 is a block diagram illustrating an example of a network system 100 on which one or more embodiments of the system may be implemented. System 100 may include any of: user devices 104, 106 and 108; communications network 102; other components; or any suitable combination of the foregoing.

As used herein, a "network" is a group of two or more components interconnected by one or more segments of transmission media on which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network is illustrated in a drawing of this application as being connected to an element in the drawing, the connected element itself is considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing.

A network (e.g., network 102) may be or include any of a variety of types of network including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

It should be appreciated that although FIG. 1 only illustrates three user devices, any number of user devices may be included as part of network system 100, including tens, hundreds, thousands, tens of thousands, or even hundreds of thousands or millions of user devices.

Each user device may communicate with other user devices by sending streams of packets across communications network 102. Any of a variety of known communication protocols and standards may be used to communicate packets across the network. These protocols may include the use of Forward Error Correction (FEC) techniques. FEC is a protocol used in communicating data packets that allows for the correction of data transmission errors on the receiving end of a communication. As used herein, a "data transmission error"

is an error in which a piece of information (e.g., a bit, a byte, character, etc.) is not properly conveyed from one network device to another. Data transmission errors are typically associated with a degradation of the communication channel on which information is conveyed. This degradation may result from a variety of factors, including the distance between the sender of the information and the receiver of the information, the original strength of a signal on which the information is carried, interference, other factors, or any suitable combination of the foregoing. As used herein, a "communication channel" or "channel" is a communication path between two network devices over which information is communicated. This path may include one or more segments of transmission media and may be specific to a particular frequency, wavelength or time slot of a communication. The communication channel may be any of variety of types of channel such as, for example, a channel of a software-defined radio.

Prior to the transmission of information, the information may be divided into blocks, typically of a predefined size, for example, as codewords in accordance with a block encoding scheme of a network communications protocol. An encoder (e.g., an FEC encoder) may encode the blocks using a predetermined algorithm. This predetermined algorithm may add extra bits specifically for error correction of pieces of information (e.g., bit, byte and/or character) within the block. This encoding may be performed at the data link layer of a network protocol stack. On the receiving end of a communication, perhaps at the data link layer, a decoder (e.g., an FEC encoder) may decode the encoded blocks of information. Using the extra bits added by the encoder, the decoder may determine whether any of the information within each block was improperly conveyed—i.e., if there were any information transmission errors. If any information transmission errors are detected, the decoder may correct the errors (i.e., repair the data) to the extent that it can.

Figure 2:
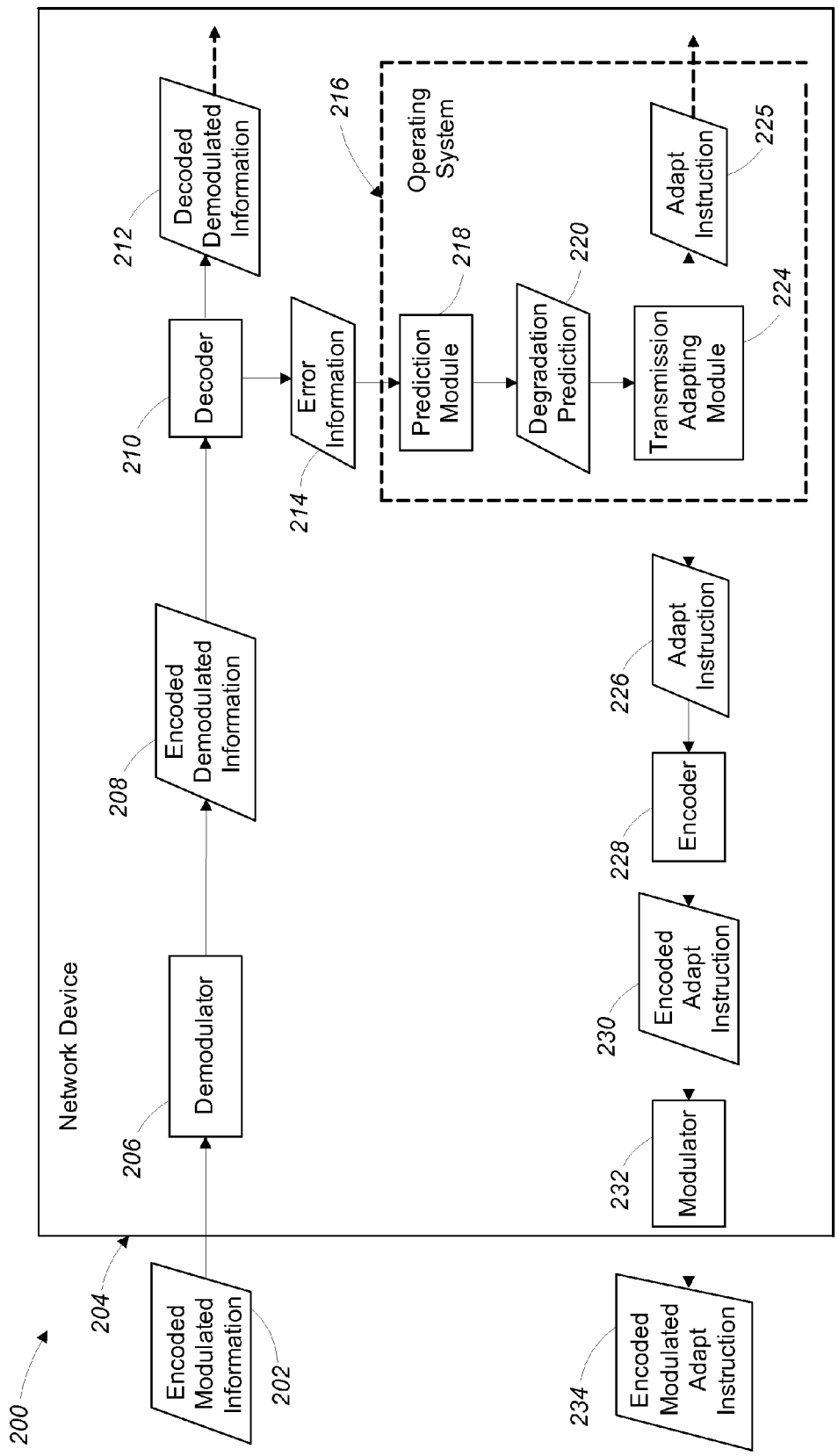
FIG. 2. is data flow diagram illustrating an example of a system for predicting the degradation below a particular threshold of an ability to accurately convey information on a communication channel and adapting information transmission and/or reception in response to the prediction, according to some embodiments of the invention.

FIG. 2 is a block diagram illustrating an example of a system 200 for predicting the degradation below a particular threshold of an ability to accurately convey information on a communication channel and adapting information transmission and/or reception in response to the prediction, according to some embodiments of the invention. System 204 is merely an illustrative embodiment of a system for predicting such a degradation and adapting information transmission and/or reception in response to the prediction, and is not intended to limit the scope of the invention. Any of numerous other implementations of such a system, for example, variations of system 200, are possible and are intended to fall within the scope of the invention.

System 200 may include a network device 204, which may be any of a plurality of types of network devices, and may be any of user devices 104, 106 and 108. Network device 204 may include any of demodulator 206, decoder 210, prediction module 218, transmission adapting module 224, encoder 228 and modulator 232. As illustrated in FIG. 2, prediction module 218 and/or transmission adapting module 224 may be implemented as part of an operating system 216 of network device 204. Operating system 216 may be any of a variety of operating systems such as, for example, any of the operating systems described below. It should be appreciated that any of components 206, 210, 228 and 232 also may be implemented as part of operating system 216.

Demodulator 206 may be any known type of demodulator and may be configured to receive encoded modulated information 202 on a communication channel, for example, from another network device. Information 202 may have been modulated in accordance with any of a variety of known modulation techniques. Demodulator 206 may be configured to demodulate information 202 to produce encoded demodulated information 208.

Decoder 210 (e.g., an FEC decoder) may be configured to decode information 208 to produce decoded demodulated information 212, which may be passed to another component of network device 204 for further processing. Information 208 may be in the form of series of blocks (e.g., code words of a block encoding scheme) of information. The size of an information block (e.g., number of pieces of information, bits or bytes) may be determined based on an application, standard and/or protocol used to encode the information, e.g., the size of the codeword used. This size may have any of a plurality of values, for example, from 200 bits or less up to several thousand bytes or more. Decoder 210 may be configured to decode each block (e.g., using FEC decoding techniques) to produce decoded information 212 as a series of blocks (e.g., as described above).

In some embodiments of the invention, error information determined by decoder 210 may be used to predict the degradation below a particular threshold of an ability of the communication channel to accurately convey information. For example, prediction module 218 may be configured to receive error information 214 from decoder 210 and predict whether such a degradation will occur using this information. Prediction module 218 may make this prediction based, at least in part, on one or more error metrics associated with one or more information blocks and/or a pattern of error detection between the blocks. The error metric(s) may be included in error information 214, and the error pattern may be determined by prediction module 218.

The error metric may be any of a variety of metrics indicative of a quantity of error associated with one or more information blocks, including, but not limited to: a number of errors detected within an information block; a soft-error distance corresponding to an information block; a probability ratio corresponding to an information block; another metric; and any suitable combination of the forgoing.

The number of detected errors may be utilized as a metric when hard decision decoding (HDD) is employed by decoder 210 to determine whether a piece of information is in error. HDD decoding involves making a binary decision as to whether a piece of information is an error or is not an error. That is, the decision is either "yes" if there is an error or "no" if there is not an error.

A soft-error distance may be used as a metric when soft decision decoding (SDD) is employed by decoder 210 to determine whether a piece of information is an error. Unlike HDD, in which a binary yes/no decision is made, in SDD, a soft decision is made. That is, rather than determining whether the detected voltage of a piece of information represents a zero or a one (i.e., yes or no), and then using this binary value to determine whether a data transmission error has occurred, SDD retains the voltage level of the piece of information, and uses this voltage level to determine whether an error has occurred. For example, if a logical "1" equates to a voltage level of 1.0 volts, and a received voltage for a piece of information is 0.9 volts, rather than determining that the piece of information is a logical "1", the value of 0.9 volts is retained. Rather than accumulating the number of errors that occur during a block by performing binary operations on each piece of information, SDD involves determining distances between the detected received voltages and a real number ("alpha"), which is a Euclidean distance normalized by an estimate of the average energy per received piece of information. The cumulative distances between detected voltage levels and alpha for pieces of information within a block define the soft-error distance of the block.

A probability ratio also may be used as a metric when any of a variety of known algorithms (e.g., the Viterbi algorithm) are used to determine the probable states of pieces of information within information blocks. For example, such an algorithm may be used to determine the likelihood of values of pieces of information within codewords. The probability ratio may be the ratio of the most probable value of a codeword to the second-most probable value of the codeword. A low probability ratio (meaning that the two probabilities are close in value) may be indicative of the effects of interference on the transmission of the information.

Prediction module 218 also may be configured to determine a pattern between the error rates of a series of information blocks. For example, the extent to which an error metric has changed over a period of time may be determined. This extent may be measured using any of a variety of known metrics such as, for example, a percentage or ratio. The period of time considered may depend on any of a variety of factors such as the application and the desired performance. The time period may have any of a variety of values, such as, for example, ranging from ten milliseconds or less to fifty milliseconds, one hundred milliseconds or even more.

The prediction module may be configured to use data transmission error information (e.g., one or more metrics) and/or the error rate pattern to predict a degradation below a threshold of the ability of a communications channel to adequately convey information. For example, a metric of a most recently received information block and the error rate over a particular period of time may be compared against a threshold metric and a threshold period of time. Thus, the degradation threshold may be a combination of a metric threshold and an error rate threshold. For example, the degradation threshold may be a combination of: twenty data transmission errors within a most recently received block; and an error rate increase of ten percent over a fifty millisecond period of time. A chosen threshold should correlate to art acceptable level of performance of the communication channel. For example, for embodiments in which the metric is a number of data transmission errors within a block, the error correction capability of the decoder may be considered when selecting the threshold number of the data transmission errors. For example, if the decoder (e.g., an FEC decoder) has an error correction capability of thirty errors per codeword, then the error threshold may be set at twenty errors per code word. The threshold may be set lower than the capability to correct errors, as in the above example, so that exceeding this capability can be anticipated (i.e., predicted) and prevented.

Figure 3:
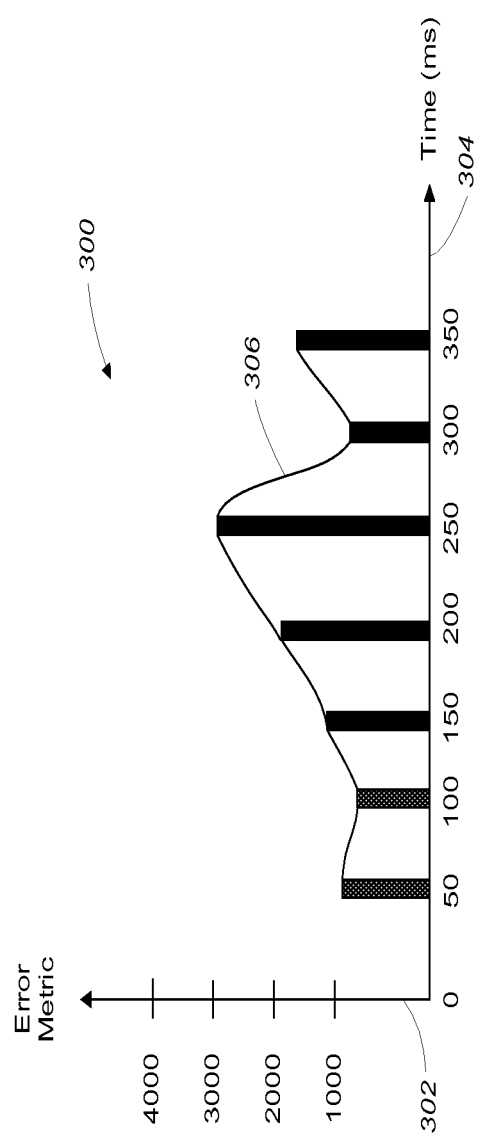
FIG. 3 is a histogram illustrating data transmission error information on a communication channel over a period of time, according to some embodiments of the invention.

FIG. 3 is a histogram 300 illustrating an example embodiment of data transmission error information over a period of time. The vertical axis 302 represents an error metric (e.g., the number of errors, a soft error distance or a probability ratio) and the horizontal axis 304 represents time. For the sake of illustration, it will be assumed that the metric used is the number of errors. As illustrated in FIG. 3, in the first 50 milliseconds, 800 data transmission errors were detected. It should be appreciated that during this 50-millisecond interval or any of the remaining time periods, several information blocks may have been received, possibly tens of thousands or even hundreds of thousands, or even more. Further, during a second 50-second interval up to 100 milliseconds, 600 errors were detected; 1000 errors were detected between 100 and 150 milliseconds; 1800 errors were detected between 150 and 200 milliseconds; and 3700 errors were detected between 200 and 250 milliseconds. The pattern 306 illustrated in histogram 300, beginning at 100 milliseconds, may be indicative of the sending and receiving network devices that are moving further apart from each other.

If the error rate threshold is set at a 20% increase over fifty milliseconds, then this threshold is reached at the percent changes detected at the 150-, 200- and 250-millisecond marks. Thus, in some embodiments, if the metric threshold is also reached during these intervals, then the degradation threshold has been reached. Consider the example in which the metric threshold is twenty errors per information block. If the most recent block received at the 150-millisecond mark only has fifteen data transmission errors, then the degradation threshold has not been met. This would explain why the number of errors detected within the next 50 milliseconds increases. Similarly, at the 200-millisecond mark, the most recently received information packet may have included only nineteen data transmission errors, which is still below the threshold. Accordingly, the transmission reception of packets is not adapted and (as the pattern 306 illustrates) the number of errors in the next 50 milliseconds increases even further.

However, at the 250-millisecond mark, a most recently received block may have included twenty-five errors, which exceeds the twenty error threshold. Accordingly, because the error rate threshold has been satisfied (greater than 20% increase since the 200 millisecond mark) and the error number threshold has been satisfied (over 20), the degradation threshold has been met. In response, the prediction module 218 may pass an indication of this degradation prediction 220 to transmission adapting module 224.

In response to receiving degradation prediction 220, module 224 may adapt the transmission and/or reception of information on the communication channel by sending an adapt instruction 225 to the appropriate components of network device 204 and/or sending an adapt instruction 226 to the network device with which communications are being made over the communication channel. Adapt instruction 226 may pass through encoder 228 to produce encoded adapt instruction 230, which may be input to modulated 232, which produces encoded modulated adapt instruction 234, which can be sent to the other network device.

Adapt instruction 225 and/or 226 may include instructions to change the error encoding scheme being used to transmit information on the channel. For example, a standard cell-phone error encoding scheme uses rate-1/2 code, which has a one-to-one ratio between content data and redundancy data. That is, there is a one-to-one ratio between each piece of transmitted information and a redundant piece of information. In light of the prediction of a degradation below a threshold, adapt instruction may indicate to change this rate to rate-1/3 code, for which two pieces of redundant information are transmitted for each piece of information. Changing the error rate scheme in this manner increases the ability to accurately transmit information (e.g., as the distance between the sending and receiving devices grows), but at the expense of throughput.

In some embodiments, in addition to changing the error encoding scheme, or as an alternative, an additional communication channel may be opened between the two devices, e.g., to accommodate a loss of throughput. Communications between the two devices then may be sent on both channels to compensate for a loss in throughput. For example, for a cell phone communication, one channel may be used for exchanging content, while the other channel may be used to exchange signal information, and/or the content itself may be multiplexed between the two communication channels. Thus, adapt instruction 225 and/or 226 may indicate to create an additional communication channel.

As a result of adapting the reception and/or transmission of information, the number of errors within each information block and the error rate over a period of time may decrease. For example, as shown if FIG. 3, if the error rate scheme is changed for the communication channel and/or a new communication channel is opened in response to the degradation threshold being reached at 250 milliseconds, then the number of errors within the next 50-millisecond interval may decrease. For example, from 2700 errors at 250 milliseconds down to 600 errors at 300 milliseconds, as shown in histogram 300. If the reaching of the degradation threshold was caused by an increasing distance between the communication devices and this distance continues to increase, then, even after the adapting of the transmission and/or reception of information, the number of errors will again begin to increase. For example, as shown in FIG. 3, the number of errors at 350 milliseconds is 1100, up from 600 errors detected during the previous interval. If the number of errors and the error rate again reach their respective thresholds, another adapting of the transmission and/or reception of information can be performed. For example, the error encoding rate may again be changed and/or another communication channel may be opened.

Although FIG. 3 is described primarily in relation to the use of a number of errors as an error metric, it should be appreciated that an analogous technique can be used if the metric is a soft error distance and/or a probability ratio.

Systems 100 and/or 200, and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 100 may reside on a single device (e.g., a computer), or one or more components may reside on separate, discrete devices. Further, each component may be distributed across multiple devices, and one or more of the devices may be interconnected.

Further, on each of the one or more devices that include one or more components of system 100 and/or 200, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100 and/or 200, and components thereof, may be implemented using a computer system such as that described below in relation to FIGS. 4 and 5.

Figure 4:
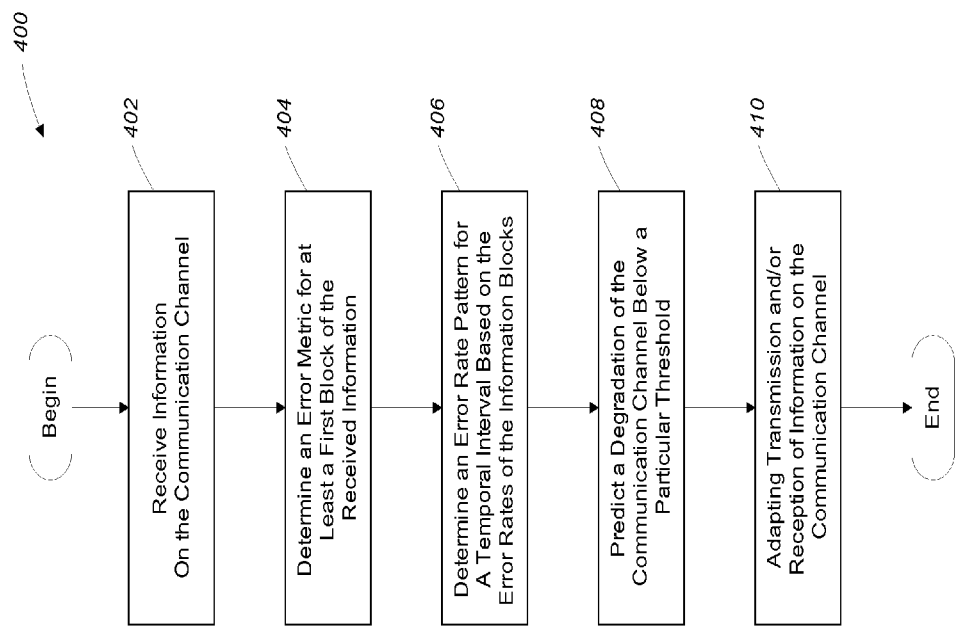
FIG. 4. is an flow chart illustrating an example of a method of predicting the degradation below a particular threshold of an ability to accurately convey information on a communication channel below a particular threshold and adapting information transmission and/or reception in response to the prediction, according to some embodiments of the invention.

FIG. 4 is a flow chart illustrating an example of a method 400 of predicting the degradation below a particular threshold of an ability to accurately convey information on a communication channel and adapting information transmission and/or reception in response to the prediction, according to some embodiments of the invention. Method 400 is merely an illustrative embodiment of a method of predicting such a degradation, and is not intended to limit the scope of the invention. Other implementations of such a method, for example, variations of method 400, are possible and are intended to fall within the scope of the invention.

Information may be received on a communication channel in Act 402. In Act 404, one or more error metrics for at least a first block of the received information may be determined, for example, as described above in relation to the decoder 210 and the prediction module 218 of system 200. The error metric of a particular block may be considered its error rate.

In Act 406, an error rate pattern for a temporal interval may be determined based on the error rates of the individual information blocks, for example, as described above in relation to prediction module 218 of system 200.

The degradation below a particular threshold of an ability of a communication channel to accurately convey information may be predicted in Act 408, for example, as described above in relation to prediction module 218.

In Act 410, the transmission and/or reception of information on the communication channel may be adapted. For example, as described above in relation to transmission adapting module 224, transmission and/or reception may be adapted by changing an error rate scheme used to transmit/receive information and/or by adding an additional communication channel over which to transmit information.

Method 400 may include additional acts. Further, the order of the acts performed as part of method 400 is not limited to the order illustrated in FIG. 3, as the acts may be performed in other orders and/or one or more of the acts may be performed in series or in parallel, at least partially.

Method 400 and acts thereof, and various embodiments and variations of this methods and these acts, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to RA, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 400 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 200, 500 and 600 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described in relation to FIGS. 1, 2, 5 and 6, that perform the functions described herein can be generically considered as one or more controllers that control such functions. The one or more controllers can be implemented in iumerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

Figure 5:
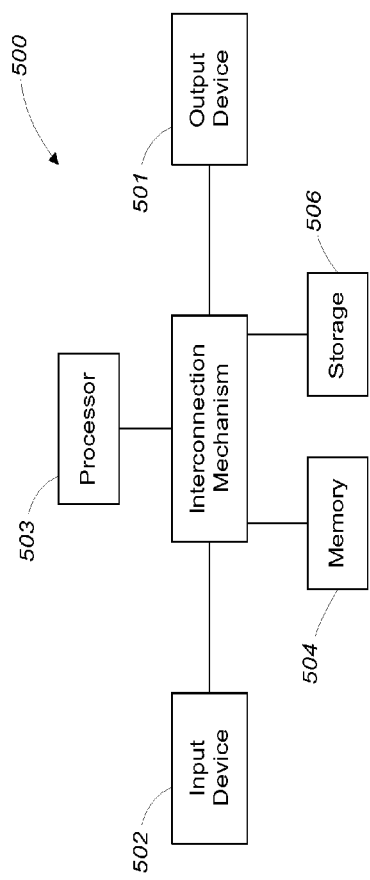
FIG. 5 is a block diagram illustrating an example of a computer system on which some embodiments of the invention may be implemented.
Figure 6:
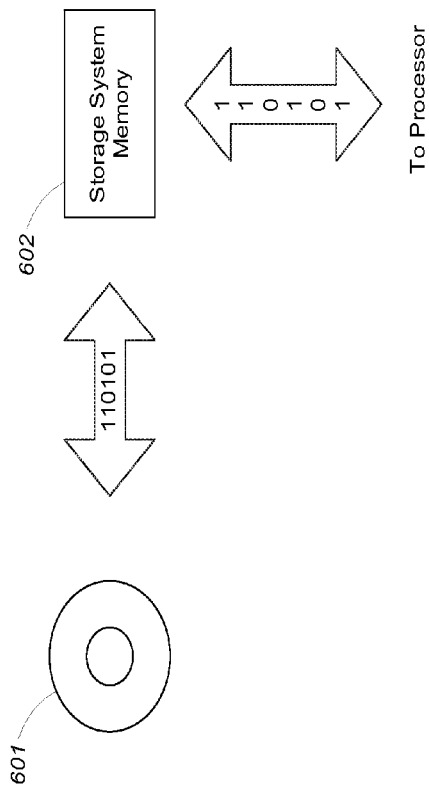
FIG. 6 is a block diagram illustrating an example of a storage system that may be used as part of the computer system to implement some embodiments of the invention.

For example, various aspects of the invention may be implemented as specialized software executing in a general-purpose computer system 500 such as that shown in FIG. 5. The computer system 500 may include a processor 503 connected to one or more memory devices 504, such as a disk drive, memory, or other device for storing data. Memory 504 is typically used for storing programs and data during operation of the computer system 500. Components of computer system 500 may be coupled by an interconnection mechanism 505, which may include one or more busses (e.g., between components that are integrated within a same machine) and/or a network (e.g., between components that reside on separate discrete machines). The interconnection mechanism 505 enables communications (e.g., data, instructions) to be exchanged between system components of system 500. Computer system 500 also includes one or more input devices 502, for example, a keyboard, mouse, trackball, microphone, touch screen, and one or more output devices 501, for example, a printing device, display screen, speaker. In addition, computer system 500 may contain one or more interfaces (not shown) that connect computer system 500 to a communication network (in addition or as an alternative to the interconnection mechanism 505.

The storage system 506, shown in greater detail in FIG. 5, typically includes a computer readable and writeable nonvolatile recording medium 601 in which signals are stored that define a program to be executed by the processor or information stored on or in the medium 601 to be processed by the program. The medium may, for example, be a disk or flash memory. Typically, in operation, the processor causes data to be read from the nonvolatile recording medium 601 into another memory 602 that allows for faster access to the information by the processor than does the medium 601. This memory 602 is typically a volatile, random access memory such as a dynamic random access memory (DRAM) or static memory (SRAM). It may be located in storage system 506, as shown, or in memory system 504, not shown. The processor 503 generally manipulates the data within the integrated circuit memory 504, 602 and then copies the data to the medium 601 after processing is completed. A variety of mechanisms are known for managing data movement between the medium 601 and the integrated circuit memory element 504, 602, and the invention is not limited thereto. The invention is not limited to a particular memory system 504 or storage system 506.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 500 is shown by way of example as one type of computer system upon which various aspects of the invention may be practiced, it should be appreciated that aspects of the invention are not limited to being implemented on the computer system shown in FIG. 5. Various aspects of the invention may be practiced on one or more computers having a different architecture or components that that shown in FIG. 5.

Computer system 500 may be a general-purpose computer system that is programmable using a high-level computer programming language. Computer system 500 also may be implemented using specially-programmed, special-purpose hardware. In computer system 500, processor 503 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows XIP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A method performed on a computing device that includes at least one processor and memory, the method comprising:
    predicting, by the computing device, a degradation of a communication over a first communication channel, where the predicting comprises comparing a number of data transmission errors with a threshold that indicates an ability of the first communication channel to accurately convey information;
    adapting, by the computing device in response to the predicting, the communication occurring over the first communication channel, where the adapting comprises at least one of:
        changing an error encoding scheme utilized for the communication occurring over the first communication channel, or
        performing the communication utilizing a second communication channel in addition to the first communication channel.

2. The method of claim 1 where the adapting comprises both the changing and the performing.

3. The method of claim 1 where a prediction resulting from the predicting is indicated by an adapt instruction.

4. The method of claim 1, the method further comprising repeating the adapting in response to further predicting further degradation of the communication after the adapting.

5. The method of claim 1 where the predicting is based on-an error rate pattern of portions of the communication.

6. The method of claim 1 where the predicting indicates that the ability to accurately convey the information is anticipated to fall below the threshold.

7. The method of claim 6 where the threshold correlates to an acceptable level of performance for conveying the information over the at least one communication channel.

8. At least one computer storage media storing computer-executable instructions that, when executed by at least one processor of a computing device that includes memory, cause the computing device to perform actions comprising:
    predicting, by the computing device, a degradation of a communication over a first communication channel, where the predicting comprises comparing a number of data transmission errors with a threshold that indicates an ability of the first communication channel to accurately convey information;
    adapting, by the computing device in response to the predicting, the communication occurring over first communication channel, where the adapting comprises at least one of:
        changing an error encoding scheme utilized for the communication occurring over the first communication channel, or
        performing the communication utilizing a second communication channel in addition to the first communication channel.

9. The at least one computer storage media of claim 8 where the adapting comprises both the changing and the performing.

10. The at least one computer storage media of claim 8 where a prediction resulting from the predicting is indicated by an adapt instruction.

11. The at least one computer storage media of claim 8, the actions further comprising repeating the adapting in response to further predicting further degradation of the communication after the adapting.

12. The at least one computer storage media of claim 8 where the predicting is based on error metrics of portions of the communication.

13. The at least one computer storage media of claim 8 where the predicting indicates that the ability to accurately convey the information is anticipated to fall below the threshold.

14. The at least one computer storage media of claim 13 where the threshold correlates to an acceptable level of performance for conveying the information over the at least one communication channel.

15. A system comprising a computing device and at least one software module that are together configured for performing actions, the computing device including at least one processor and memory, the actions comprising:
    predicting, by the computing device, a degradation of a communication over a first communication channel, where the predicting comprises comparing a number of data transmission errors with a threshold that indicates an ability of the first communication channel to accurately convey information;

adapting, by the computing device in response to the predicting, the communication occurring over the first communication channel, where the adapting comprises at least one of:

changing an error encoding scheme utilized for the communication occurring over the first communication channel, or performing the communication utilizing a second communication channel in addition to the first communication channel.

16. The system of claim 15 where the adapting comprises both the changing and the performing.

17. The system of claim 15 where a prediction resulting from the predicting is indicated by an adapt instruction.

18. The system of claim 15, the actions further comprising repeating the adapting in response to further predicting further degradation of the communication after the adapting.

19. The system of claim 15 where the predicting is based on error metrics of portions of the communication.

20. The system of claim 15 where the predicting indicates that the ability to accurately convey the information is anticipated to fall below the threshold.

* * * * *